J. E. MARCEAU.
STEERING GEAR.
APPLICATION FILED SEPT. 22, 1916. RENEWED AUG. 5, 1918.
1,305,298. Patented June 3, 1919.
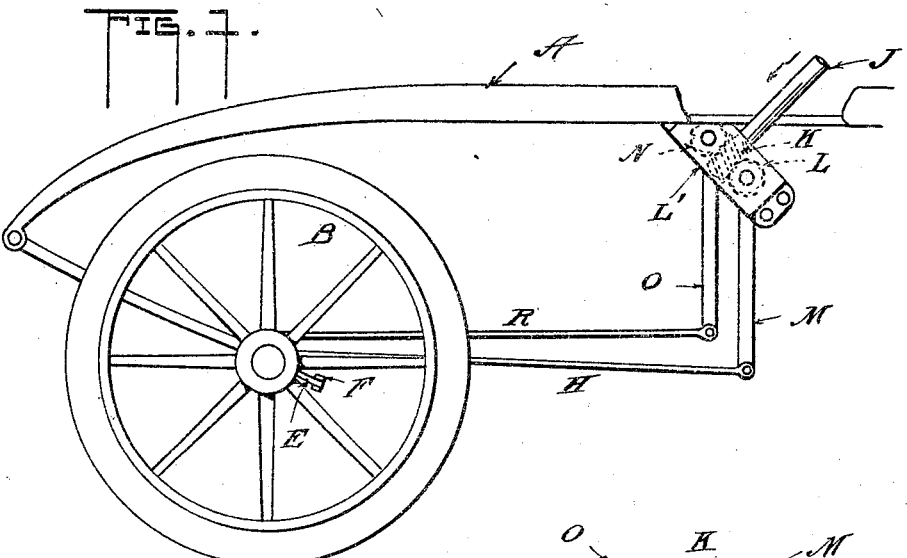
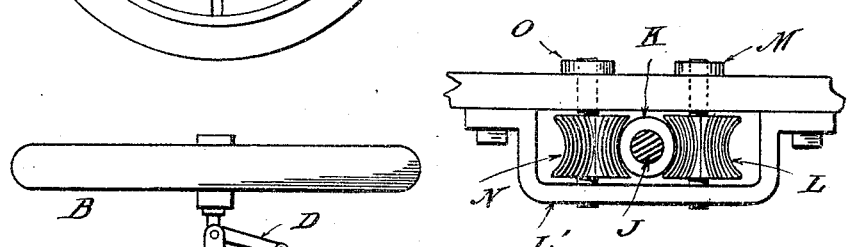
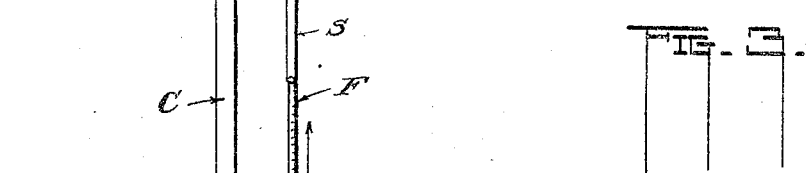
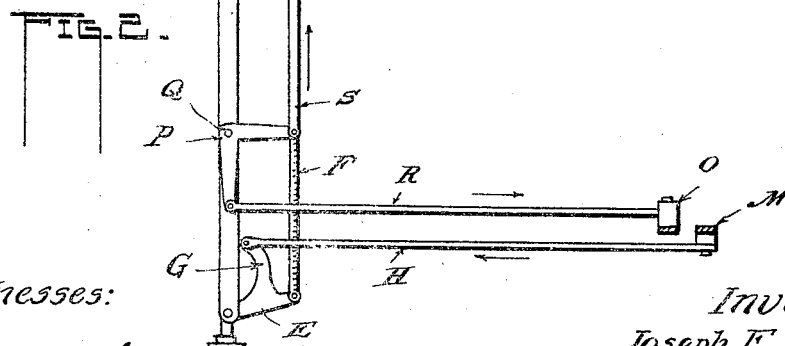
Witnesses:
S. B. Boyd
Fred B. Elgin
Inventor:
Joseph E. Marceau
By L. M. Thurlow
Atty.

UNITED STATES PATENT OFFICE.

JOSEPH E. MARCEAU, OF FAIRBURY, ILLINOIS.

STEERING-GEAR.

1,305,298. Specification of Letters Patent. Patented June 3, 1919.

Application filed September 22, 1916, Serial No. 121,642. Renewed August 5, 1918. Serial No. 248,497.

*To all whom it may concern:*

Be it known that I, JOSEPH E. MARCEAU, citizen of the United States, residing at Fairbury, in the county of Livingston and State of Illinois, have invented certain new and useful Improvements in Steering-Gears, and do hereby declare that the following is a full, clear, and exact description of the invention, which will enable others skilled in the art to which it appertains to make and use the same.

This invention relates to improvements in steering gear for horseless vehicles. More particularly, it relates to new forms of connections between the steering post, or steering column, and the front guiding wheels of a horseless vehicle.

To the end that the invention may be clearly understood I have provided the accompanying drawing, in which, Figure 1 is a side elevation of a portion of the forward part of a horseless vehicle, showing the preferred form of my invention applied thereto.

Fig. 2 is a plan of part of the steering gear; and,

Fig. 3 is a plan of a pair of worm wheels and the steering column together with its worm which engages said wheels, all as seen in the direction of the arrow in Fig. 1.

A is a portion of the frame or chassis of a horseless vehicle. B B' represent the usual front guiding wheels, and C the front axle, I having merely illustrated sufficient of the parts to show the connection of my invention therewith.

D and E are the usual steering arms on which the said guiding wheels B are mounted in the customary manner, said arms being pivotally mounted on the said axle C and connected by the rod F pivoted to each, G being an arm extending from the arm E to the usual steering rod H is connected which has connection, in turn, with the mechanism of the steering post.

As far as described the mechanism is not unlike that commonly used but the parts which enter into the invention and which operate in combination with the parts already described will now be made clear.

In the drawing K is the worm of the steering column J, and L represents the ordinary worm-wheel from which depends an arm M to which the mentioned rod H is pivoted. N is a second worm-wheel in engagement with and at the opposite side of the worm from the first said worm-wheel, the column and said worm-wheels being suitably journaled in a support L' secured to the framing A. Depending from said worm-wheel N is an arm O similar to the arm M. P is a bell-crank pivoted at Q on the axle C, for example, or any other part of the gearing that may be chosen for supporting it, and R is a rod connecting one of its arms with the described arm O.

The other arm of the bell-crank is connected to the arm D through a rod S which parallels the rod F previously mentioned. However, the said bell-crank P may have connection, if desired, with said rod F instead of employing the said rod S since the same direction of movement would be transmitted in the operation thereof.

When the steering post J is turned the worm-wheels L N will be turned in opposite directions, moving the arms O M in opposite directions as well. The disposal of the bell-crank P is such that while one of its arms moves in the same direction as the rod F which connects the arms D E, the other arm of said crank, together with the rod R, has a direction of movement the opposite of that of the rod H connected with the arm M. Now, should one of the guiding wheels meet an obstruction, for instance B', such obstruction will tend to change the course thereof, but the impact on the wheel is transferred along the rod F to the opposite wheel B which would tend to move that wheel but this is prevented by the bell-crank P whose arm to which the rod R is attached tends to move in a different direction from that of the rod H which is the direction the wheel B' would move it. Since the said rods H R are attached to the arms O M which move in opposite directions and since these are fixed relatively to their worm-wheels and the latter are at opposite sides of the worm, the guiding wheels must be effectively held. Nevertheless, the steering wheel is in no way prevented having perfectly free action for steering purposes, its movement being as free as with any other of the old types of steering mechanism.

It is preferable to dispose the rods R H horizontally but they may even slant downwardly toward the rear so that obstructions striking one of the guiding wheels will not tend to lift the car at the side having the rods as occurs in some makes of vehicles. By increasing the length of the arms O M a greater extent of swinging movement can be imparted to them so that, if desired, the pitch of the thread of the worm may be considerably reduced and still have the required extent of swinging movement of said arms.

The disposal of the rods H R as shown in Fig. 2 is important in that they are placed at one side of the position of the engine, its crank case and the transmission so that they will be entirely out of the way of those members. Furthermore by thus placing the parts the power from the worm-wheels is transmitted directly forward to the members E, P without the intermediary of other parts thus making a more positive action and introducing no lost motion usually accompanying added parts.

It is not my wish to be confined to the structure shown and described since changes may be made that will still lie within the scope of the invention and the meaning of the appended claims.

Having thus described my invention, I claim:—

1. In a steering gear for horseless vehicles, a pair of road wheels, a steering arm for each wheel, a rod connecting the arms, and a steering column and its worm located at one side of the vehicle, a pair of worm wheels engaging the worm at opposite sides, an arm depending from each worm wheel, a rod connected to each of said depending arms, both rods extending forward to and one of them having attachment with one of the steering arms, a bell-crank, means operatively connecting one arm of the same with one of the steering arms, the other rod having connection with the other arm of the said bell-crank, the parts being arranged whereby opposite directions of movement of the rods will transmit the same direction of movement to the wheels.

2. In a steering gear for horseless vehicles, the combination with its steering ground wheels, their steering arms, and a steering column including a worm, of a bell crank mounted on the vehicle, a member connecting the bell crank with one of the arms, a pair of worm wheels engaging the worm at opposite sides, an arm extending from each worm, a rod connecting one of the last named arms with one of the said steering arms, and a rod connecting the other of said last named arms with the bell crank.

In testimony whereof I affix my signature in presence of two witnesses.

JOSEPH E. MARCEAU.

Witnesses:
N. J. FOSTER,
GEO. MORRISET.

Copies of this patent may be obtained for five cents each, by addressing the "Commissioner of Patents, Washington, D. C."